(12) United States Patent
Shimo (10) Patent No.: US 11,781,504 B2
(45) Date of Patent: Oct. 10, 2023

(54) BLEED PLENUM FOR COMPRESSOR SECTION

(71) Applicant: HONEYWELL INTERNATIONAL INC., Charlotte, NC (US)

(72) Inventor: Masayoshi Shimo, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/451,340

(22) Filed: Oct. 19, 2021

(65) Prior Publication Data

US 2023/0121620 A1 Apr. 20, 2023

(51) Int. Cl.
*F02K 3/06* (2006.01)

(52) U.S. Cl.
CPC .............. *F02K 3/06* (2013.01); *F05D 2220/32* (2013.01)

(58) Field of Classification Search
CPC .......................... F04D 27/009; F04D 27/0207
See application file for complete search history.

(56) References Cited

U.S. PATENT DOCUMENTS

| | | | | |
|---|---|---|---|---|
| 4,844,689 A | * | 7/1989 | Seed | ...................... F04D 27/023 415/169.1 |
| 5,845,482 A | * | 12/1998 | Carscallen | ............. F04D 27/023 60/226.3 |
| 9,528,391 B2 | * | 12/2016 | Dougan, Jr. | ............... F02C 6/08 |
| 10,227,930 B2 | | 3/2019 | Saxena et al. | |
| 10,480,454 B2 | * | 11/2019 | Bruhat | ..................... F02K 3/075 |
| 10,544,802 B2 | * | 1/2020 | Brilliant | ................ F04D 25/045 |
| 10,550,715 B2 | | 2/2020 | Leyko et al. | |
| 2009/0297335 A1 | | 12/2009 | Karafillis et al. | |
| 2012/0275912 A1 | * | 11/2012 | Moniz | ................... F04D 29/545 415/199.5 |
| 2014/0109589 A1 | * | 4/2014 | Pritchard, Jr. | ............ F02C 6/08 60/785 |
| 2018/0119619 A1 | | 5/2018 | Watson et al. | |
| 2018/0313364 A1 | | 11/2018 | Moeckel et al. | |
| 2018/0355877 A1 | | 12/2018 | Donnelly et al. | |
| 2018/0363901 A1 | * | 12/2018 | Gallier | ..................... F01D 5/187 |
| 2020/0166211 A1 | * | 5/2020 | Dudebout | ................ F23R 3/06 |
| 2020/0378313 A1 | | 12/2020 | Leyko et al. | |
| 2020/0386109 A1 | * | 12/2020 | Becker | .................. F04D 29/542 |

FOREIGN PATENT DOCUMENTS

DE 102019110834 A1 10/2020

* cited by examiner

*Primary Examiner* — Todd E Manahan
*Assistant Examiner* — David P. Olynick
(74) *Attorney, Agent, or Firm* — Lorenz & Kopf LLP (57) ABSTRACT

A bleed plenum for a compressor section associated with a gas turbine engine includes a plenum chamber having a first wall spaced apart from a second wall to define a plenum slot configured to receive a flow of fluid from the compressor section. A slot angle of the plenum slot is defined between a centerline of the plenum slot and a longitudinal axis of the gas turbine engine and varies about a circumference of the bleed plenum. The second wall includes a bullnose having a wedge angle defined between the second wall and a surface associated with the compressor section. The bullnose faces into the flow of fluid through the plenum slot, and the wedge angle of the bullnose varies about the circumference of the bleed plenum.

17 Claims, 6 Drawing Sheets

BLEED PLENUM FOR COMPRESSOR SECTION

TECHNICAL FIELD

The present disclosure generally relates to a compressor section, and more particularly relates to a bleed plenum for a compressor section associated with a gas turbine engine.

BACKGROUND

Gas turbine engines may be employed to power various devices. For example, a gas turbine engine may be employed to propel or supply power to a mobile platform, such as an aircraft. Gas turbine engines include a compressor section that increases a pressure of a fluid, such as air, prior to combustion. In certain instances, the pressurized fluid may be bled from the compressor section to supply air to secondary flow circuits, such as cabin air systems, cooling systems associated with the gas turbine engine, etc. The bleeding of the pressurized fluid, however, creates aerodynamic loss, which reduces an efficiency of the gas turbine engine and may increase fuel consumption.

Accordingly, it is desirable to provide a bleed plenum for a compressor section associated with a gas turbine engine, which has reduced aerodynamic losses. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a bleed plenum for a compressor section associated with a gas turbine engine. The bleed plenum includes a plenum chamber having a first wall spaced apart from a second wall to define a plenum slot configured to receive a flow of fluid from the compressor section. A slot angle of the plenum slot is defined between a centerline of the plenum slot and a longitudinal axis of the gas turbine engine and varies about a circumference of the bleed plenum. The second wall includes a bullnose having a wedge angle defined between the second wall and a surface associated with the compressor section. The bullnose faces into the flow of fluid through the plenum slot, and the wedge angle of the bullnose varies about the circumference of the bleed plenum.

The bleed plenum includes at least one bleed valve coupled to the plenum chamber and configured to define a first flow zone and a second flow zone through the bleed plenum. The slot angle has a first value range at the first flow zone and the slot angle has a second value range at the second flow zone. The first value range is greater than the second value range. The plenum slot is continuous about the circumference of the bleed plenum. The first flow zone is defined adjacent to the at least one bleed valve and the second flow zone is defined so as to be circumferentially spaced apart from the at least one bleed valve. The first wall extends at a first wall angle relative to the longitudinal axis, and the first wall angle varies about the circumference of the bleed plenum. The second wall extends at a second wall angle relative to the longitudinal axis, the second wall angle varies about the circumference of the bleed plenum and the second wall angle is different than the slot angle.

Also provided is a compressor section for a gas turbine engine. The compressor section includes at least one compressor stage, and a bleed plenum disposed circumferentially about the at least one compressor stage. The bleed plenum includes a bleed valve and a plenum slot defined between a first wall and a second wall of the bleed plenum. The plenum slot is continuous about a circumference of the bleed plenum. The bleed valve is configured to define a first flow zone and a second flow zone through the bleed plenum, and a slot angle of the plenum slot defined between a centerline of the plenum slot and a longitudinal axis of the gas turbine engine varies about the circumference of the bleed plenum.

The second wall includes a bullnose having a wedge angle defined between the second wall and a surface associated with the compressor section, the bullnose facing into the flow of fluid through the plenum slot, and the wedge angle of the bullnose varies about the circumference of the bleed plenum. The slot angle has a first value range at the first flow zone and the slot angle has a second value range at the second flow zone, and the first value range is different than the second value range. The first value range is greater than the second value range. The first flow zone is defined adjacent to the bleed valve. The second flow zone is defined so as to be circumferentially spaced apart from the bleed valve. The first wall extends at a first wall angle relative to the longitudinal axis, and the first wall angle varies about the circumference of the bleed plenum. The second wall extends at a second wall angle relative to the longitudinal axis, the second wall angle varies about the circumference of the bleed plenum and the second wall angle is different than the slot angle. The first wall and the second wall extend from a plenum chamber, the plenum slot is fluidly coupled to the plenum chamber, and the bleed valve is fluidly coupled to the plenum chamber.

Further provided is a gas turbine engine that extends along a longitudinal axis. The gas turbine engine includes a compressor section having at least one compressor stage, and a bleed plenum disposed circumferentially about the at least one compressor stage. The bleed plenum includes a bleed valve and a plenum chamber including a first wall and a second wall that cooperate to define a plenum slot that is continuous about a circumference of the bleed plenum. The bleed valve is configured to define a first flow zone and a second flow zone through the bleed plenum. A slot angle of the plenum slot defined between a centerline of the plenum slot and the longitudinal axis varies about the circumference of the bleed plenum. The second wall includes a bullnose having a wedge angle defined between the second wall and a surface associated with the compressor section, the bullnose facing into the flow of fluid through the plenum slot, and the wedge angle of the bullnose varies about the circumference of the bleed plenum.

The slot angle has a first value range at the first flow zone that is greater than a second value range of the slot angle at the second flow zone. The first flow zone is defined about and adjacent to the bleed valve, and the second flow zone is defined so as to be circumferentially spaced apart from the bleed valve.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a bleed plenum and the use of the bleed plenum for a compressor section associated with a gas turbine engine described herein is merely one exemplary embodiment according to the present disclosure. In addition, while the bleed plenum is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% of a value to account for manufacturing tolerances.

Figure 1:
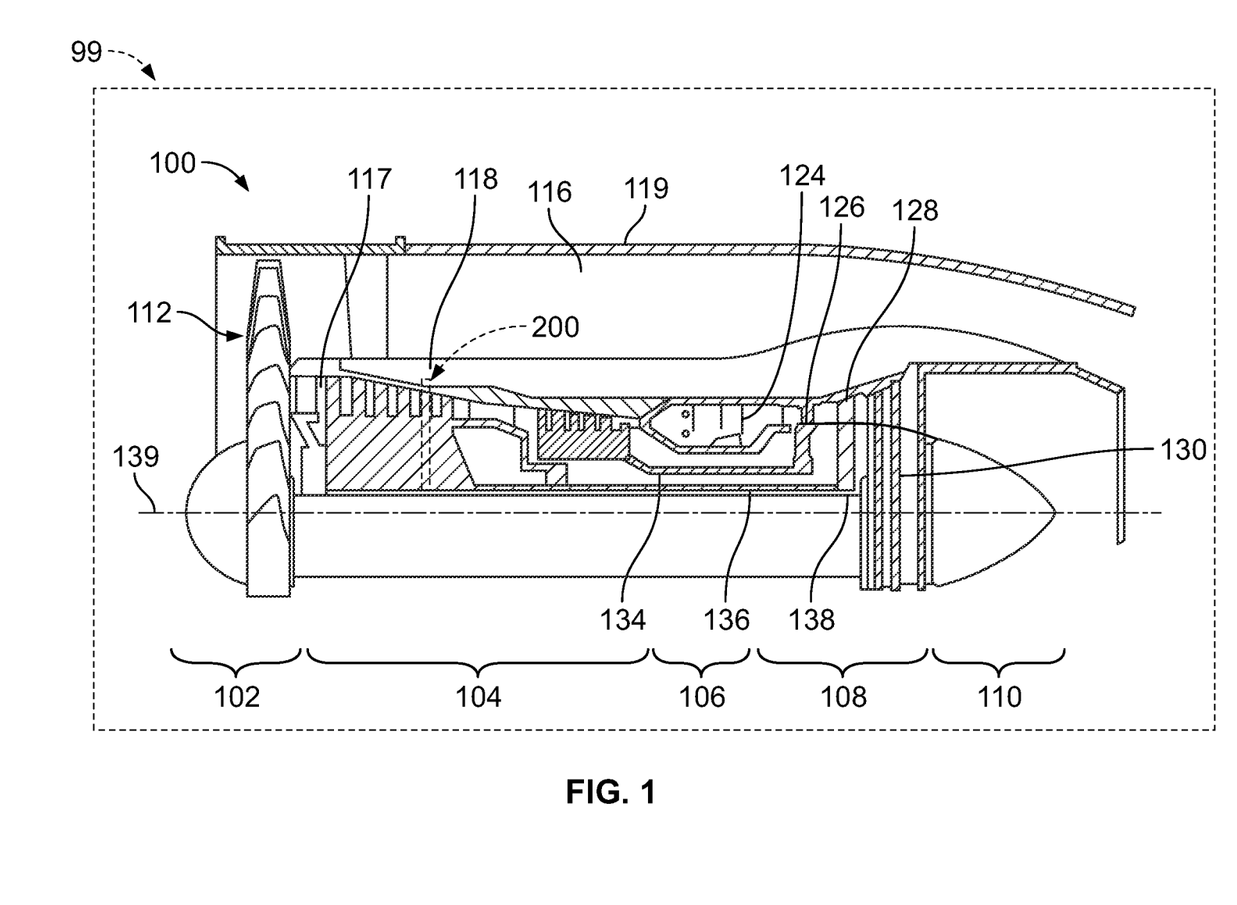
FIG. 1 is a schematic cross-sectional illustration of a gas turbine engine, which includes an exemplary bleed plenum for a compressor section in accordance with the various teachings of the present disclosure.

With reference to FIG. 1, a partial, cross-sectional view of an exemplary gas turbine engine 100 is shown with the remaining portion of the gas turbine engine 100 being substantially axisymmetric about a longitudinal axis 139, which also comprises an axis of rotation for the gas turbine engine 100. In the depicted embodiment, the gas turbine engine 100 is an annular multi-spool turbofan gas turbine jet engine. As will be discussed herein, the gas turbine engine 100 includes a bleed plenum 200 associated with a compressor section 104. The bleed plenum 200 reduces aerodynamic loss by varying a slot angle of a plenum slot 208 (FIG. 4) about a circumference of the bleed plenum 200. By reducing aerodynamic loss, the bleed plenum 200 improves an efficiency of the compressor section 104 and thus, the gas turbine engine 100. In addition, by reducing aerodynamic loss, the bleed plenum 200 also increases bleed flow capacity. In this regard, reducing the aerodynamic loss increases supply pressure at an inlet of a bleed valve 202 associated with the bleed plenum 200, which drives more flow capacity out of the compressor section 104 while minimizing the impact on specific fuel consumption. It should be noted that while the bleed plenum 200 is illustrated and described herein as being used with the gas turbine engine 100, the bleed plenum 200 can be employed with various types of engines, including, but not limited to, gas turbine engines included with auxiliary power units, turbofan, turboprop, turboshaft, and turbojet engines, whether deployed onboard an aircraft, watercraft, or ground vehicle (e.g., a tank), included within industrial power generators, or utilized within another platform or application. In this example, the gas turbine engine 100 is employed within an aircraft 99.

In this example, with reference back to FIG. 1, the gas turbine engine 100 includes a fan section 102, the compressor section 104, a combustor section 106, a turbine section 108, and an exhaust section 110. The fan section 102 includes a fan 112 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104 along a core flowpath 117. The outer bypass duct 116 is generally defined between an inner casing 118 and an outer casing 119. The compressor section 104 includes one or more stages 120, which will be discussed in greater detail below. The compressor section 104 sequentially raises the pressure of the air and directs a majority of the high pressure air into the combustor section 106. A bleed valve 202 extracts a fraction of the compressed air through the bleed plenum 200, which is provided to a consumer 199 (FIG. 4), such as a secondary flow circuit, including but not limited to, a cooling circuit used to cool, among other components, turbine blades in the turbine section 108, a cabin air system, a system for stage matching of one of the compressor stages 120a, 120b, 120d, etc.

In the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 and the intermediate pressure turbine 128 drives the stages 120 in the compressor section 104 via shafts 134, 136, and the low pressure turbine 130 drives the fan 112 via a shaft 138.

Figure 2:
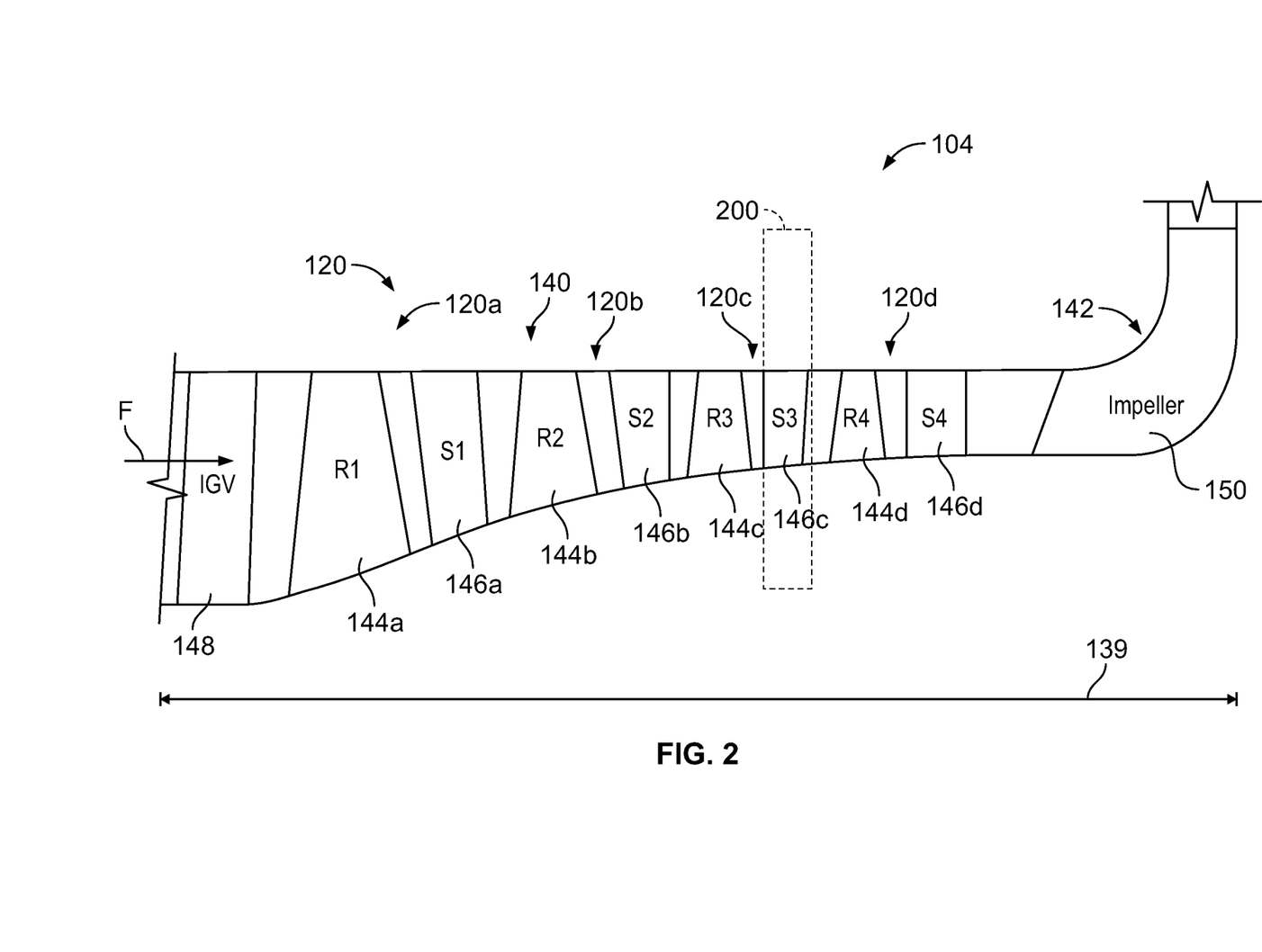
FIG. 2 is a schematic meridional sectional view through the compressor section of FIG. 1, which illustrates the bleed plenum positioned about an exemplary stage of the compressor section.

With reference to FIG. 2, a meridional sectional view through the compressor section 104 is shown. In this example, the compressor section 104 includes an axial compressor section 140 and a centrifugal compressor section 142. The axial compressor section 140 includes one or more rotors 144 and one or more stators 146 arranged in one or more stages 120 in an axial direction along the centerline or longitudinal axis 139. In one example, the axial compressor section 140 comprises a four stage axial compressor. It should be noted, however, that the axial compressor section 140 can include a number of stages 120, and thus, the number of stages illustrated and described herein is merely exemplary. In this example, the one or more rotors 144 includes four rotors 144a-144d and the one or more stators 146 includes four stators 146a-146d. The four rotors 144a-144d and the four stators 146a-146d cooperate to define the four stages 120a-120d of the axial compressor section 140, with rotor 144a and stator 146a forming a first stage 120a; rotor 144b and stator 146b forming a second stage 120b; rotor 144c and stator 146c forming a third stage 120c; and rotor 144d and stator 146d forming a fourth stage 120d. As will be discussed herein, the bleed plenum 200 is positioned circumferentially about one or more of the stages 120a-120d. In this example, the bleed plenum 200 is positioned circumferentially about the stator 146c, however, the bleed plenum 200 may be positioned circumferentially about any one of the stators 146a-146d.

The axial compressor section 140 also includes an inlet guide vane system 148, which is upstream from the first stage 120a. The centrifugal compressor section 142 includes an impeller 150, and may also include a diffuser and a deswirl section (not shown). Since the inlet guide vane system 148, the stages 120a-120d, the impeller 150 and the diffuser and deswirl section are generally known in the art, they will not be discussed in great detail herein.

Figure 3:
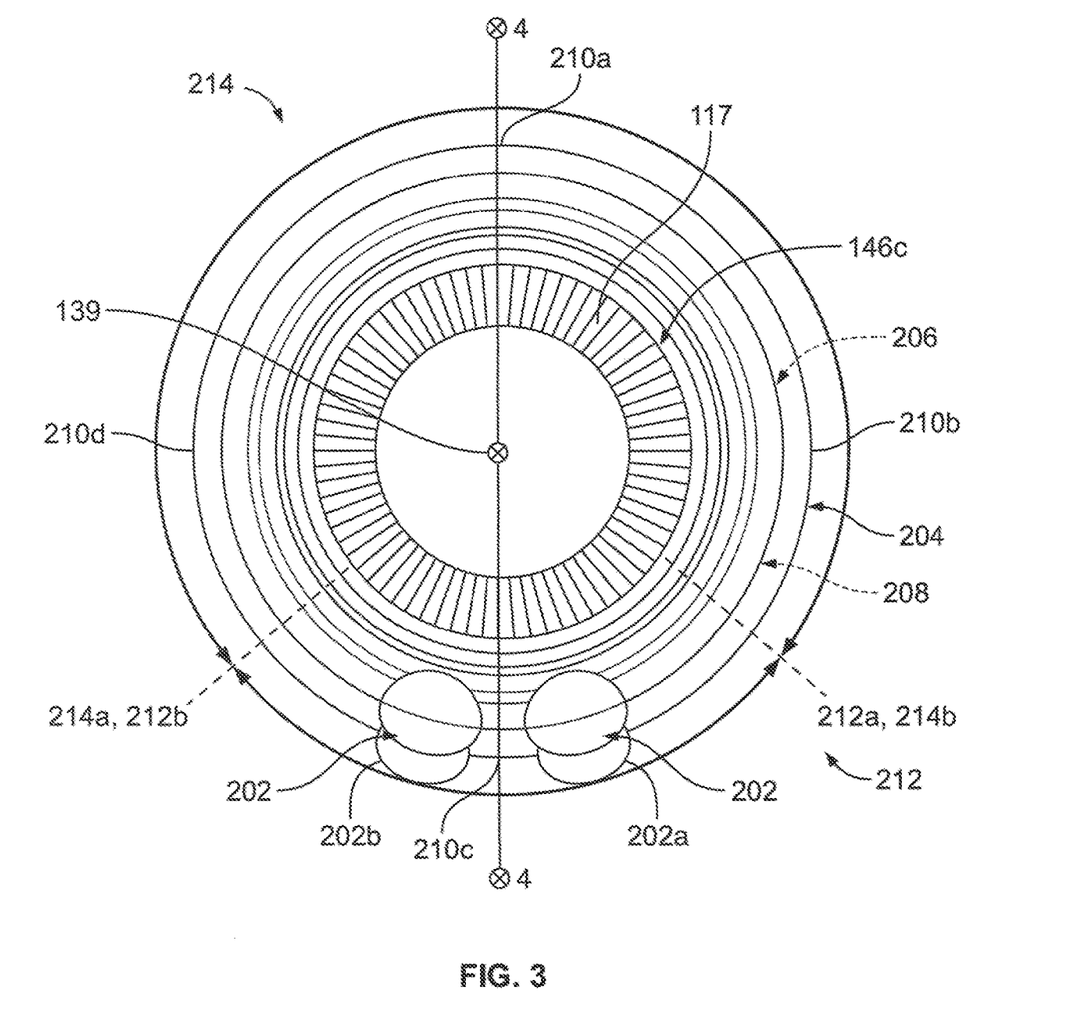
FIG. 3 is a front view of the bleed plenum.
Figure 4:
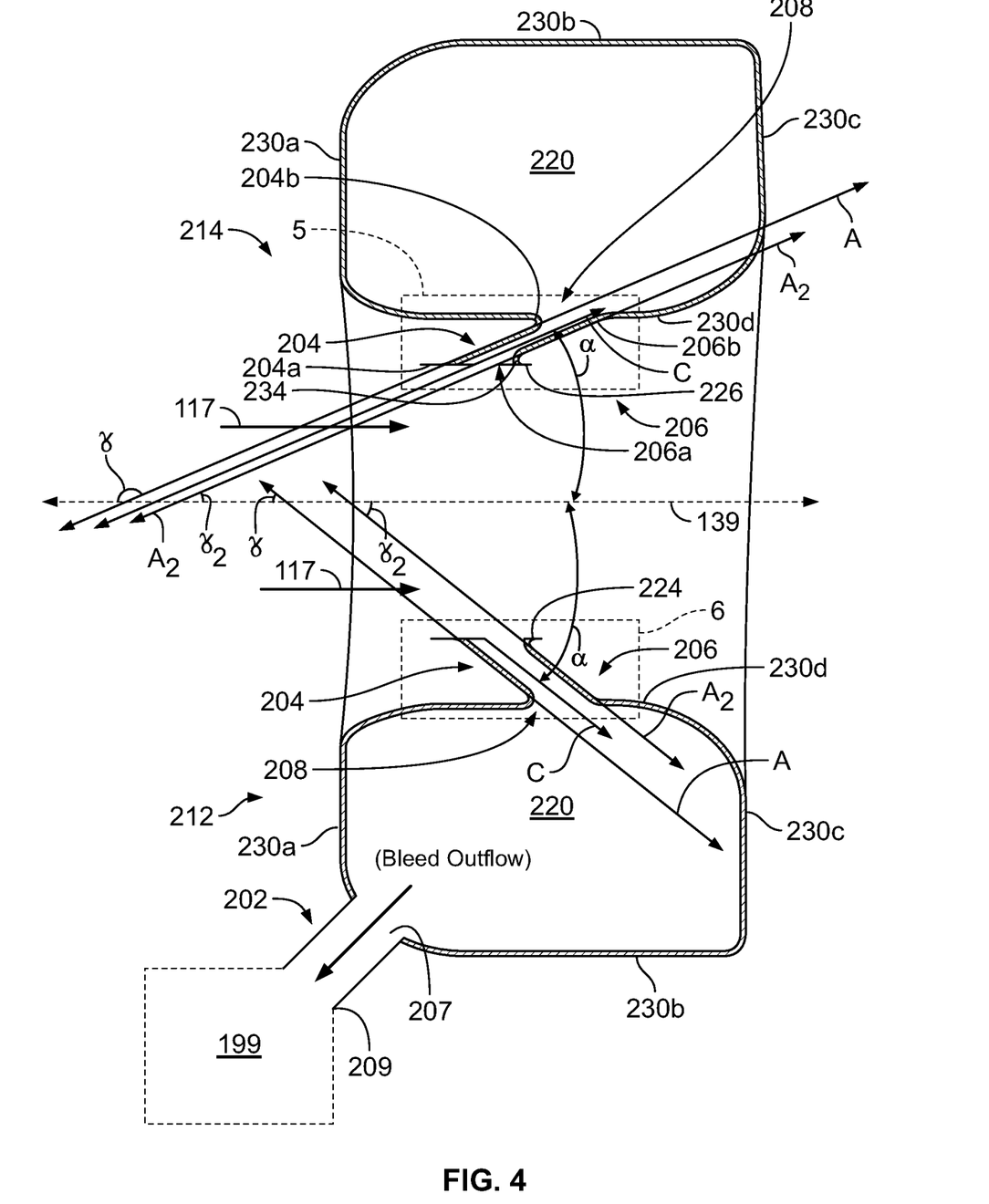
FIG. 4 is a cross-sectional view of the bleed plenum, taken along line 4-4 of FIG. 3.

With reference to FIG. 3, a front view of the bleed plenum 200 is shown. In this example, the bleed plenum 200 includes at least one of the bleed valves 202, and in this example, includes two bleed valves 202a, 202b. The bleed plenum 200 also includes a first wall 204 and a second wall 206 that cooperate to define a plenum slot 208. The bleed valves 202a, 202b each have an inlet 207 in fluid communication with the plenum slot 208 and an outlet 209 (FIG. 4) in fluid communication with the consumer 199 (FIG. 4). Each of the outlets 209 is coupled to ducting, pneumatic hoses, conduits, and the like to direct the air bled from the core flowpath 117 to the consumer 199 (FIG. 4). In one example, the bleed valves 202a, 202b are each electronically controlled valves, such as an electronically controlled air flow valve, and are each in communication with a controller associated with the gas turbine engine 100, such as a FADEC, which has a suitable processor and memory to receive one or more control signals to open the bleed valve 202a, 202b to enable bleed airflow to the consumer 199 (FIG. 4), or to close the bleed valve 202a, 202b to inhibit airflow to the consumer 199 (FIG. 4). The bleed valves 202a, 202b may also be controlled to various positions between open and closed. In other embodiments, the bleed valves 202a, 202b may be pneumatic valves, which are controlled by a source of air supplied from the controller of the gas turbine engine 100.

In this example, the bleed valves 202 are positioned at about bottom dead center of a circumference of the bleed plenum 200. In other words, the circumference of the bleed plenum 200 is at top dead center at 0 degrees or 210a, is at 90 degrees at 210b, is at 180 degrees or bottom dead center at 210c and is at 270 degrees at 210d. The bleed valves 202a, 202b are each positioned adjacent to or about at bottom dead center 210c, which results in a non-uniform flow distribution through the plenum slot 208 as the mass flow rate of air increases near the location of the bleed valves 202. By positioning the bleed valves 202a, 202b adjacent to or about at bottom dead center 210c, a first, high flow zone 212 is generated about and adjacent to the bleed valves 202a, 202b. The bleed valves 202a, 202b are controlled to open to draw fluid from the core flowpath 117 to an area of lower pressure than the fluid in the core flowpath 117. The difference in pressure creates the high flow zone 212 as when the bleed valves 202a, 202b are opened, the fluid in the core flowpath 117 is drawn into the area of low pressure. The fluid has a first mass flow rate range at the high flow zone 212, which is different and greater than a second mass flow rate range of the fluid at a second, low flow zone 214.

The high flow zone 212 generally extends for about 45 degrees on either side of the bleed valve 202. In this example, since the bleed valves 202a, 202b are adjacent to each other, the high flow zone 212 extends for about 90 degrees along the bleed plenum 200, from about 135 degrees at high flow boundary 212a to about 225 degrees at high flow boundary 212b. A remainder of the circumference of the bleed plenum 200 is the second, low flow zone 214 as the mass flow rate is low through the remainder of the plenum slot 208 due to the absence of the bleed valves 202. In this regard, as the remainder of the bleed plenum 200 is devoid of bleed valves 202, the flow of the air through the bleed plenum 200 has the second mass flow rate range, which is different and less than the first mass flow rate range of the fluid in the high flow zone 212. Thus, the bleed valves 202 create an increase in local mass flow rates or the high flow zone 212, and the absence of the bleed valves 202 results in a decrease in local mass flow rates or the low flow zone 214. The low flow zone 214 extends from about 225 degrees at low flow boundary 214a to zero degrees at top dead center 210a and from top dead center 210a to about 135 degrees at low flow boundary 214b. The second mass flow rate range or the low flow zone 214 is defined circumferentially spaced apart from the bleed valve 202. In one example, the total mass flow rate of air through the bleed plenum 200 is about 0.1% to about 30% of the total mass flow rate through the core flowpath 117. In this example, the high flow zone 212 is an area of the bleed plenum 200 in which the mass flow rate of airflow through the plenum slot 208 is 50% or greater of the total mass flow rate of air through the bleed plenum 200. The low flow zone 214 is an area of the bleed plenum 200 in which the mass flow rate of airflow through the plenum slot 208 is below or less than 50% of the total mass flow rate of air through the bleed plenum 200. Thus, the mass flow rate of the air through the bleed plenum 200 at the high flow zone 212 is 50% or greater of the total mass flow rate through the bleed plenum 200 (or 50% of the about 0.1% to about 30% of the total mass flow rate through the core flowpath 117) and the mass flow rate of the air through the bleed plenum 200 at the low flow zone 214 is less than 50% (or less than 50% of the about 0.1% to about 30% of the total mass flow rate through the core flowpath 117).

In this example, each of the first wall 204 and the second wall 206 are annular and are spaced apart about the longitudinal axis 139. With reference to FIG. 4, the first wall 204 and the second wall 206 extend from a plenum chamber 220 and cooperate to define the plenum slot 208. The plenum slot 208 is a continuous opening defined between the first wall 204 and the second wall 206 about the circumference of the bleed plenum 200. The first wall 204 faces into the fluid flow, and defines a leading end of the plenum slot 208. The first wall 204 extends along an axis A, which is transverse or oblique to the longitudinal axis 139. The first wall 204 extends from a first end 204a to a second end 204b. In one example, the first end 204a of the first wall 204 is upstream from the second end 204b. In this example, the first end 204a of the first wall 204 is curved to avoid flow separation. The second end 204b is coupled to the plenum chamber 220. The first wall 204 is also defined at an angle γ, which is defined between the first wall 204 and the longitudinal axis 139. In one example, the angle γ is about 170 degrees to about 150 degrees in the low flow zone 214 and the angle γ is about 149 degrees to about 125 degrees in the high flow zone 212. Thus, the angle γ of the first wall 204 relative to the longitudinal axis 139 varies about the circumference of the bleed plenum 200, as the angle γ of the first wall 204 in the low flow zone 214 is different and less than the angle γ of the first wall 204 in the high flow zone 212. Generally, the angle γ of the first wall 204 transitions linearly at the high flow boundary 212b to the angle γ in the low flow zone 214 to provide a smooth transition between the different angle ranges; and transitions linearly at the low flow boundary 214b to the angle γ of the first wall 204 in the high flow zone 212 to provide a smooth transition between the different angle ranges.

Figure 5:
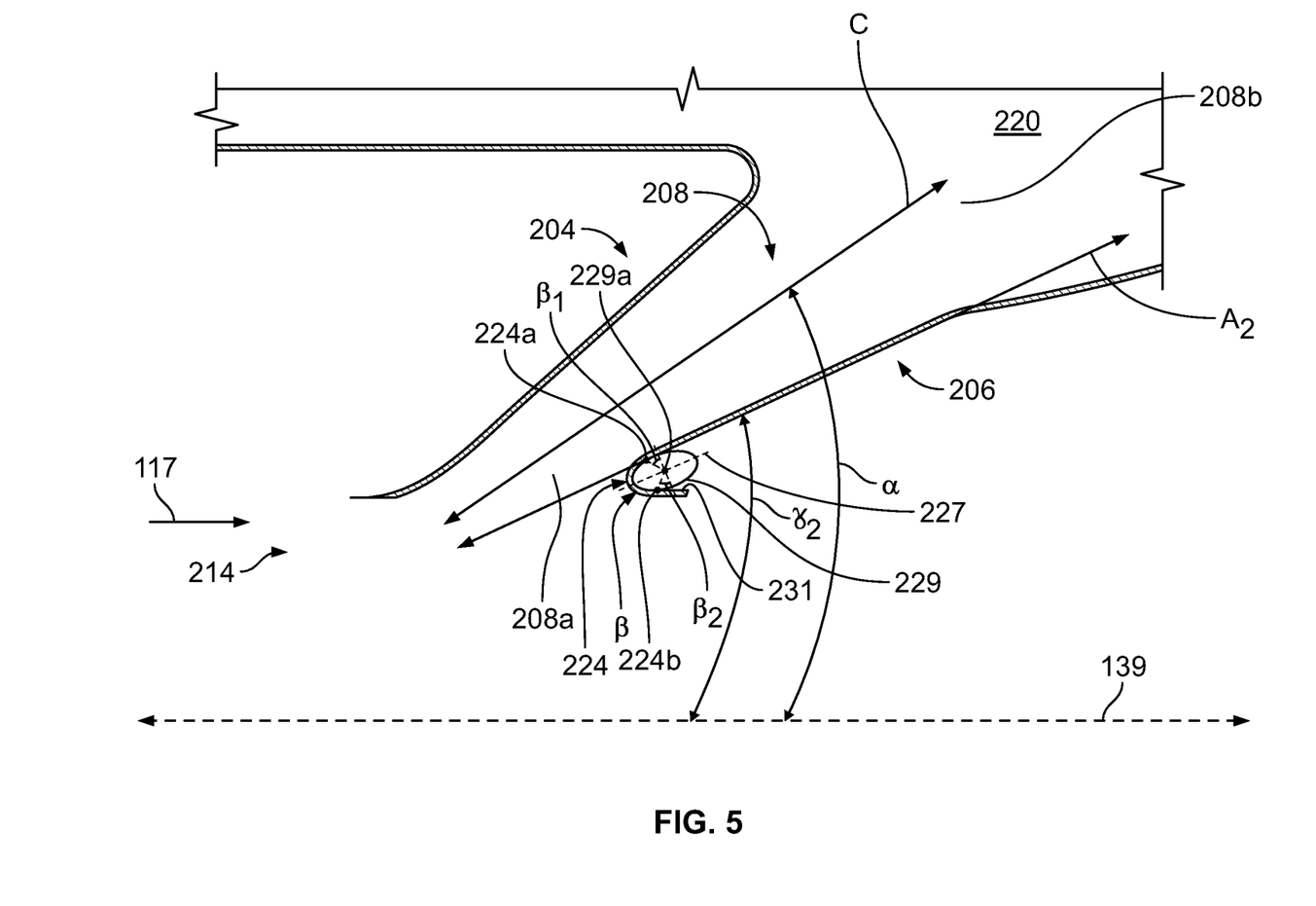
FIG. 5 is a detail cross-sectional view of the bleed plenum at a second, low flow zone taken at 5 on FIG. 4.

The second wall 206 is downstream of the first wall 204 in the direction of flow of the core flowpath 117, and defines a trailing end of the plenum slot 208. The second wall 206 extends along an axis A2, which is transverse or oblique to the longitudinal axis 139. The second wall 206 extends from a first end 206a to a second end 206b. In one example, the first end 206a of the second wall 206 is upstream from the second end 206b. The second end 206b is coupled to the plenum chamber 220. The second wall 206 includes a bullnose 224 that faces into the flow of fluid in the core flowpath 117 to guide the fluid into the plenum slot 208. With reference to FIG. 5, the bullnose 224 is at the first end 206a of the second wall 206, and is defined between the first end 206a and a casing surface 226 downstream of the second wall 206. The casing surface 226 is a portion of the inner casing 118 associated with the compressor section 104 of the gas turbine engine 100 (FIG. 1), which defines the core flowpath 117. The bullnose 224 has a wedge angle β, which is defined between a first wedge point 224a on the second wall 206 and a second wedge point 224b on the casing surface 226. In order to determine the wedge angle β, a line 227 that is equidistant between the second wall 206 and the casing surface 226 is defined, and a circle or ellipse 229 having a center point 229a at the line 227 is defined such that an arc 229b of the ellipse 229 matches the profile of the bullnose 224. The first wedge point 224a is a tangency point between the ellipse 229 and the second wall 206, and the second wedge point 224b is a tangency point between the ellipse 229 and the casing surface 226. A line 231 is defined through the center point 229a normal to the line 227. A first angle β1 is defined between the first wedge point 224a and the line 231, and a second angle β2 is defined between the second wedge point 224b and the line 231. The wedge angle β is the sum of the first angle β1 and the second angle β2.

The wedge angle β is about 0 degrees to about 180 degrees, and in one example, is about 20 degrees to about 90 degrees.

Generally, the wedge angle β of the bullnose 224 defined between the second wall 206 and the casing surface 226 varies about the circumference of the bleed plenum 200. The wedge angle β of the bullnose 224 transitions linearly about the circumference of the bleed plenum 200 to provide a smooth transition between the different wedge angle ranges. The wedge angle β reduces the loss caused by a pressure spike at the bullnose 224. In one example, the wedge angle β is greater in the high flow zone 212 as bulk flow velocity is higher in the high flow zone 212. For example, in the high flow zone 212, the wedge angle β is about 45 degrees to 90 degrees. In this example, the wedge angle β in the low flow zone 214 is different and less than the wedge angle β in the high flow zone 212 as bulk flow velocity is less in the low flow zone 214. For example, in the low flow zone 214, the wedge angle β is about 20 degrees to about 40 degrees. Increasing the wedge angle β in the high flow zone 212 may suppress flow acceleration at the bullnose 224 along with a combination of the elliptical shape of the bullnose 224.

In addition, the second wall 206 is also defined at an angle γ2, which is defined between the second wall 206 and the longitudinal axis 139. In one example, the angle γ2 is about 10 degrees to about 30 degrees in the low flow zone 214 and the angle γ2 is about 31 degrees to about 55 degrees in the high flow zone 212. It should be noted that in other embodiments, the range of values for the angle γ2 may be different. The angle γ2 of the second wall 206 relative to the longitudinal axis 139 varies about the circumference of the bleed plenum 200, as the angle γ2 of the second wall 206 in the low flow zone 214 is different and less than the angle γ2 of the second wall 206 in the high flow zone 212. Generally, the angle γ2 of the second wall 206 transitions linearly at the high flow boundary 212b to the angle γ2 in the low flow zone 214 to provide a smooth transition between the different angle ranges; and transitions linearly at the low flow boundary 214b to the angle γ2 of the second wall 206 in the high flow zone 212 to provide a smooth transition between the different angle ranges.

Figure 6:
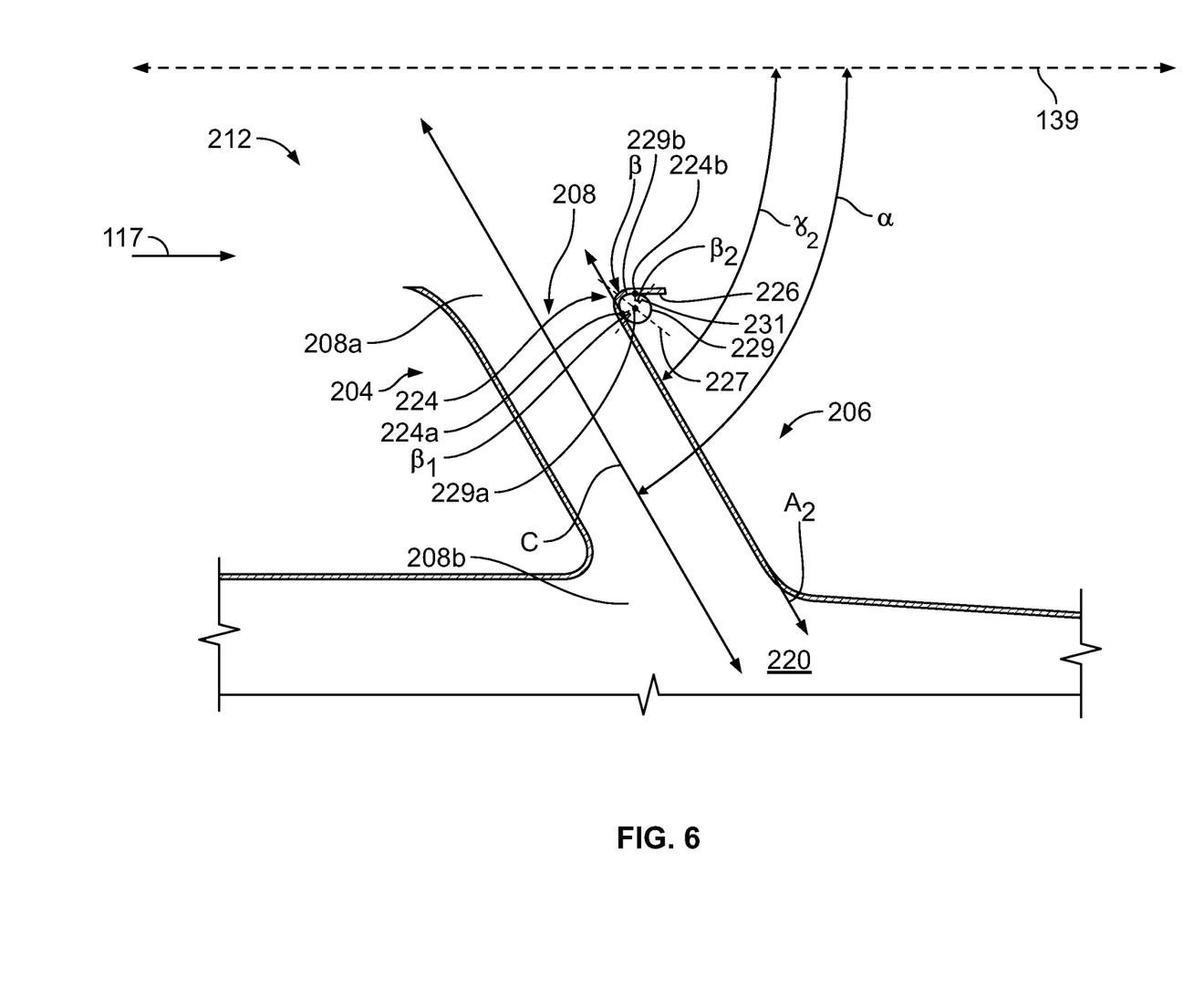
FIG. 6 is a detail cross-sectional view of the bleed plenum at a first, high flow zone taken at 6 on FIG. 4.

With reference to FIG. 4, the plenum slot 208 has a centerline C that extends from the plenum inlet 208a to a plenum outlet 208b. The centerline C is transverse or oblique to the longitudinal axis 139. The plenum slot 208 extends at a slot angle α, which is defined between the longitudinal axis 139 and the centerline C of the plenum slot 208. In one example, the slot angle α is about 10 degrees to about 39 degrees in the low flow zone 214. With reference to FIG. 6, the slot angle α is shown in the high flow zone 212. In the high flow zone 212, the slot angle α is about 40 degrees to about 70 degrees. Thus, the slot angle α of the plenum slot 208 defined between the centerline C and the longitudinal axis 139 varies about the circumference of the bleed plenum 200, as the slot angle α of the plenum slot 208 in the low flow zone 214 is different and less than the slot angle α of the plenum slot 208 in the high flow zone 212. The slot angle α has a first slot angle range in the high flow zone 212, which has the first mass flow rate range, and a second slot angle range in the low flow zone 214, which has the second mass flow rate range. Generally, the slot angle α of the plenum slot 208 transitions linearly at the high flow boundary 212b to the slot angle α in the low flow zone 214 to provide a smooth transition between the different slot angle ranges; and transitions linearly at the low flow boundary 214b to the slot angle α of the plenum slot 208 in the high flow zone 212 to provide a smooth transition between the different slot angle ranges. In this example, the plenum slot 208 has an expanding diffuser shape, such that the slot angle α is different than the angle γ2 of the second wall 206. By providing the plenum slot 208 with the diffuser shape and the angle γ2 of the second wall 206 different and smaller than the slot angle α, pressure may be recovered inside of the plenum chamber 220. In other embodiments, the plenum slot 208 may have a straight shape, such that the angle γ2 of the second wall 206 is about the same as the slot angle α.

With reference back to FIG. 4, the second end 204b of the first wall 204 and the second end 206b of the second wall 206 are each coupled to the plenum chamber 220. The plenum chamber 220 is fluidly coupled to the plenum slot 208 to receive the fluid from the core flowpath 117. The plenum chamber 220 is annular, and includes a plurality of walls 230 that cooperate to enclose the plenum chamber 220. In this example, the plenum chamber 220 includes a forward wall 230a, a top wall 230b, an aft wall 230c and a bottom wall 230d. One or more of the walls 230a-230d may be interconnected by a curved surface or fillet, if desired. The forward wall 230a is upstream from the aft wall 230c in the direction of the core flowpath 117. In one example, the inlet 207 of the bleed valves 202a, 202b may be defined where the forward wall 230a meets the top wall 230b adjacent to bottom dead center 210c. The top wall 230b defines an outer perimeter of the plenum chamber 220 and interconnects the forward wall 230a with the aft wall 230c. The aft wall 230c is downstream from the forward wall 230a, and interconnects the top wall 230b with the bottom wall 230d. The bottom wall 230d defines the inner perimeter of the plenum chamber 220. The first wall 204 and the second wall 206 are coupled to and extend from the bottom wall 230d to define the plenum slot 208. Thus, generally, the bottom wall 230d defines an opening about the inner perimeter in fluid communication with the plenum slot 208 to receive the fluid or air from the core flowpath 117.

It should be noted that the arrangement of the bleed valves 202 in the bleed plenum 200 is an example, as any number of bleed valves 202 may be employed, and the bleed valves 202a, 202b may be located at any desired position along the bleed plenum 200. Based on the arrangement and position of the bleed valves 202, the high flow zones 212 and the low flow zones 214 are generated or defined. The slot angle α and the wedge angle β for the bleed plenum 200 at a particular circumferential location is predetermined based on the local mass flow rate of the air flow. Generally, in the example of two bleed valves 202a, 202b, the high flow zone 212 is defined for about 45 degrees adjacent to the bleed valve 202, or extends for about 45 degrees circumferentially on one side of the bleed valve 202 and extends for about 45 degrees circumferentially on the opposite side of the bleed valve 202. In the high flow zones 212, the slot angle range of the plenum slot 208 is greater than the slot angle range of the plenum slot 208 in the low flow zones 214, and the wedge angle range of the bullnose 224 varies about the circumference of the bleed plenum 200. As discussed, the slot angle α of the plenum slot 208 and the wedge angle β of the bullnose 224 may transition linearly between the respective slot angle range and wedge angle range. By varying the slot angle α of the plenum slot 208 and the wedge angle β of the bullnose 224 about the circumference of the bleed plenum 200, aerodynamic loss is reduced in the plenum slot 208, which leads to higher stagnation pressure available in the plenum chamber 220.

In one example, the first wall 204, the second wall 206, and the plenum chamber 220 are integrally or monolithically formed to be one-piece from a metal or metal alloy; and is formed using additive manufacturing, including, but not limited to, direct metal laser sintering (DMLS). The bleed valves 202 are fluidly and mechanically coupled to the plenum chamber 220. Once assembled, the bleed plenum 200 may be installed in the gas turbine engine 100 so as to surround the stator 146c (FIG. 4) and the bleed valves 202 may be coupled to the controller associated with the gas turbine engine 100 (FIG. 1) and the consumer 199 (FIG. 4). During operation of the gas turbine engine 100, the bleed valves 202 may receive one or more control signals from the controller of the gas turbine engine 100, for example, to move the bleed valves 202 from the closed position (in which fluid or air collected in the plenum slot 208 and plenum chamber 220 of the bleed plenum 200 is stagnant) to the open position. The bleed valve 202 is controlled by the controller of the gas turbine engine 100 (FIG. 1), for example, to control a flow of the fluid into the plenum slot 208. In the open position, fluid or air is drawn from the core flowpath 117 through the plenum slot 208, into the plenum chamber 220 and through the bleed valves 202 to the consumer 199 (FIG. 4). By varying the slot angle α based on the local mass flow rate and the wedge angle β, loss generation in the plenum slot 208 is reduced leading to higher stagnation pressure available in the plenum chamber 220 of the bleed plenum 200.

In this regard, the varying of the slot angle α based on the local mass flow rate circumferentially results in the flow incidence relative to the bullnose 224 to be near zero, which reduces the aerodynamic loss at the plenum slot 208. In addition, the varying of the slot angle α based on the local mass flow rates of the airflow through the plenum slot 208 (high flow zone 212 or low flow zone 214) and the wedge angle β circumferentially, the bleed plenum 200 has a higher static pressure recovery factor across different bleed rates, where the bleed rates range from 10% to 20% of the total mass flow rate through the core flowpath 117. Static pressure recovery factor is defined by static pressure delta between inlet and inside of the bleed plenum 200 normalized by the inlet dynamic head, which is predetermined by computational fluid dynamics. The higher static pressure recovery value indicates that there is more pressure available to drive the bleed flow through the plenum slot 208. In one example, the bleed plenum 200 with the varying of the slot angle α and the wedge angle θ circumferentially, results in a static pressure recovery factor of about 0.09 at 10% bleed. In addition, since the bleed plenum 200 has lower aerodynamic loss, the bleed plenum 200 may be positioned further upstream in the compressor section 104 (FIG. 2). The lower aerodynamic loss generated by the bleed plenum 200 results in higher static pressure available to drive the flow into the bleed plenum 200 which reduces fuel consumption associated with the gas turbine engine 100 (FIG. 1).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A gas turbine engine that extends along a longitudinal axis, comprising:
a bleed plenum having a plenum chamber including a first wall spaced apart from a second wall along the longitudinal axis to define a plenum slot configured to receive a flow of fluid from a compressor section associated with the gas turbine engine, the plenum slot is a continuous opening defined between the first wall and the second wall about a circumference of the bleed plenum, the plenum slot has a centerline defined between the first wall and the second wall that extends from a plenum inlet to a plenum outlet, a slot angle of the plenum slot defined between the centerline of the plenum slot and the longitudinal axis varies about the circumference of the bleed plenum, the second wall includes a bullnose having a wedge angle defined between the second wall and a surface associated with the compressor section, the bullnose configured to face into the flow of fluid through the plenum slot, the wedge angle of the bullnose varies about the circumference of the bleed plenum, the second wall extends along an axis, with a second wall angle defined between the axis and the longitudinal axis, the second wall angle varies about the circumference of the bleed plenum and the slot angle is different than the second wall angle.

2. The gas turbine engine of claim 1, further comprising at least one bleed valve coupled to the plenum chamber and configured to define a first flow zone and a second flow zone through the bleed plenum.

3. The gas turbine engine of claim 2, wherein the slot angle has a first value range at the first flow zone and the slot angle has a second value range at the second flow zone.

4. The gas turbine engine of claim 3, wherein the first value range is greater than the second value range.

5. The gas turbine engine of claim 2, wherein the first flow zone is defined adjacent to the at least one bleed valve and the second flow zone is defined so as to be circumferentially spaced apart from the at least one bleed valve.

6. The gas turbine engine of claim 1, wherein the first wall extends along a first axis at a first wall angle relative to the longitudinal axis, and the first wall angle varies about the circumference of the bleed plenum.

7. A gas turbine engine that extends along a longitudinal axis, comprising:
at least one compressor stage; and
a bleed plenum disposed circumferentially about the at least one compressor stage, the bleed plenum including a bleed valve and a plenum chamber including a first wall spaced apart form a second wall along the longitudinal axis to define a plenum slot, the plenum slot is a continuous opening defined between the first wall and the second wall about a circumference of the bleed plenum, the plenum slot has a centerline defined between the first wall and the second wall that extends from a plenum inlet to a plenum outlet, the bleed valve configured to define a first flow zone and a second flow zone through the bleed plenum, a slot angle of the plenum slot defined between the centerline of the plenum slot and the longitudinal axis of the gas turbine engine varies about the circumference of the bleed plenum, the second wall extends along an axis, with a second wall angle defined between the axis and the longitudinal axis, the second wall angle varies about the circumference of the bleed plenum and the slot angle is different than the second wall angle.

8. The gas turbine engine of claim 7, wherein the second wall includes a bullnose having a wedge angle defined between the second wall and a surface associated with the at least one compressor stage, the bullnose facing configured to face into the flow of fluid through the plenum slot, and the wedge angle of the bullnose varies about the circumference of the bleed plenum.

9. The gas turbine engine of claim 7, wherein the slot angle has a first value range at the first flow zone and the slot angle has a second value range at the second flow zone, and the first value range is different than the second value range.

10. The gas turbine engine of claim 9, wherein the first value range is greater than the second value range.

11. The gas turbine engine of claim 9, wherein the first flow zone is defined adjacent to the bleed valve.

12. The gas turbine engine of claim 9, wherein the second flow zone is defined so as to be circumferentially spaced apart from the bleed valve.

13. The gas turbine engine of claim 7, wherein the first wall extends along a first axis at a first wall angle relative to the longitudinal axis, and the first wall angle varies about the circumference of the bleed plenum.

14. The gas turbine engine of claim 7, wherein the first wall and the second wall extend from the plenum chamber, the plenum slot is fluidly coupled to the plenum chamber, and the bleed valve is fluidly coupled to the plenum chamber.

15. A gas turbine engine that extends along a longitudinal axis, comprising:
a compressor section having at least one compressor stage; and
a bleed plenum disposed circumferentially about the at least one compressor stage, the bleed plenum including a bleed valve and a plenum chamber including a first wall and a second wall that extend from the plenum chamber, the first wall spaced apart from the second wall along the longitudinal axis to define a plenum slot that is a continuous opening defined between the first wall and the second wall about a circumference of the bleed plenum, the first wall extends along a first axis and the second wall extends along a second axis, a second wall angle is defined between the second axis and the longitudinal axis, the second wall angle varies about the circumference of the bleed plenum, the plenum slot has a centerline defined between the first wall and the second wall that extends from a plenum inlet to a plenum outlet, the bleed valve is configured to define a first flow zone and a second flow zone through the bleed plenum, a slot angle of the plenum slot defined between the centerline of the plenum slot and the longitudinal axis varies about the circumference of the bleed plenum, the slot angle is different than the second wall angle, the second wall includes a bullnose having a wedge angle defined between the second wall and a surface associated with the compressor section, the bullnose configured to face into the flow of fluid through the plenum slot, and the wedge angle of the bullnose varies about the circumference of the bleed plenum.

16. The gas turbine engine of claim 15, wherein the slot angle has a first value range at the first flow zone that is greater than a second value range of the slot angle at the second flow zone.

17. The gas turbine engine of claim 15, wherein the first flow zone is defined about and adjacent to the bleed valve, and the second flow zone is defined so as to be circumferentially spaced apart from the bleed valve.

* * * * *

UNITED STATES PATENT AND TRADEMARK OFFICE
CERTIFICATE OF CORRECTION

PATENT NO. : 11,781,504 B2
APPLICATION NO. : 17/451340
DATED : October 10, 2023
INVENTOR(S) : Masayoshi Shimo It is certified that error appears in the above-identified patent and that said Letters Patent is hereby corrected as shown below:

In the Claims

Column 12, Line 17 (Claim 8), delete "facing"

Signed and Sealed this
Sixteenth Day of April, 2024

Katherine Kelly Vidal
Director of the United States Patent and Trademark Office